United States Patent

[11] 3,599,557

| [72] | Inventor | Virgilio Leal<br>323 Almeria St., Urb. Valencia-Rio<br>Piedras, P.R. 00923 |
|---|---|---|
| [21] | Appl. No. | 038,787 |
| [22] | Filed | May 19, 1970 |
| [45] | Patented | Aug. 17, 1971 |

[54] COFFEE-BREWING ASSEMBLY FOR ESPRESSO COFFEEMAKING DEVICE
8 Claims, 3 Drawing Figs.

| [52] | U.S. Cl. | 99/302 R |
|---|---|---|
| [51] | Int. Cl. | A47j 31/06 |
| [50] | Field of Search | 99/295, 302, 307, 290, 300 |

[56] References Cited
UNITED STATES PATENTS

| 2,451,195 | 10/1948 | Brown | 99/295 |
| 2,688,911 | 9/1954 | Hochmayr | 99/302 |
| 2,881,692 | 4/1959 | Volcov | 99/302 X |
| 3,232,213 | 2/1966 | Valente | 99/302 |
| 3,278,087 | 10/1966 | Stasse | 99/302 |

*Primary Examiner*—Robert W. Jenkins
*Attorney*—John Cyril Malloy

ABSTRACT: A hand-manipulative coffee-brewing unit for detachable use with a South American-type espresso coffeemaking apparatus. The coffee-brewing unit includes a bowllike body adapted for containing a quantity of ground coffee and is adapted to be twist lock engaged with a hot water outlet of the coffeemaking apparatus. The coffee-brewing unit includes filter means for filtering the coffee and swing spout means for use in dispensing the coffee liquid into a cup or the like.

PATENTED AUG 17 1971 3,599,557
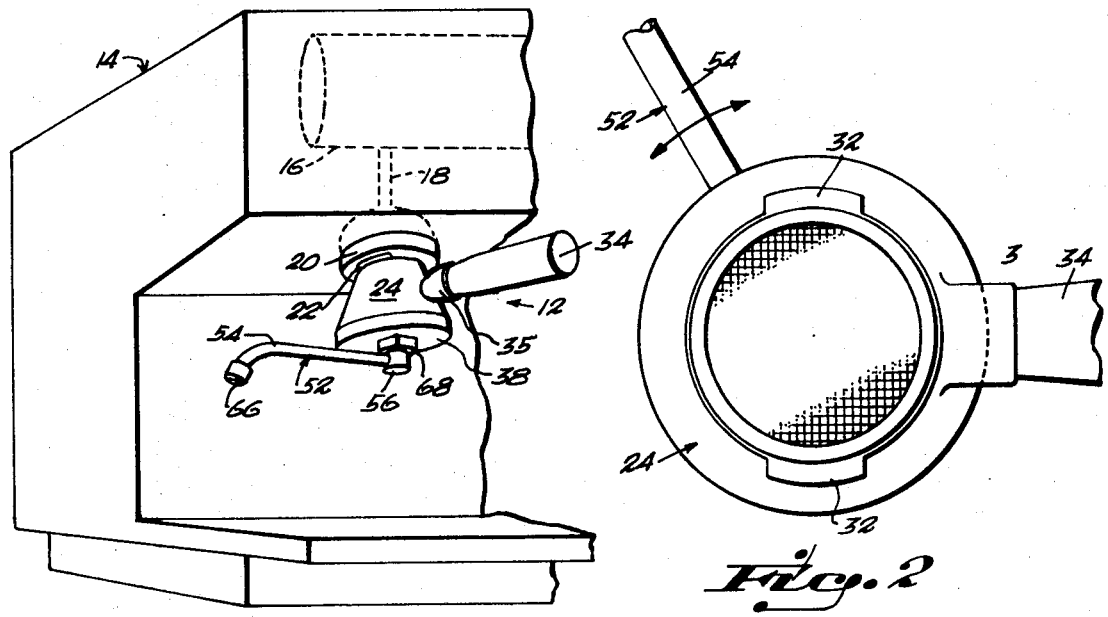
Fig.1
Fig.2
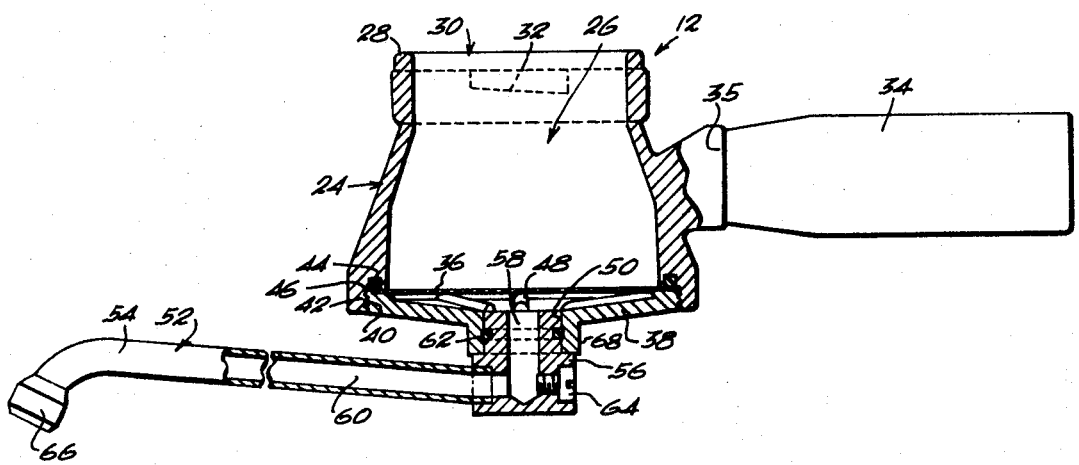
Fig.3
INVENTOR.
VIRGILIO LEAL
BY John Cyril Malloy
ATTORNEY.

COFFEE-BREWING ASSEMBLY FOR ESPRESSO COFFEEMAKING DEVICE

BACKGROUND OF THE INVENTION

1. Field of the Invention

Relates to coffeemaking apparatus generally and particularly relates to South American-type espresso coffeemaking apparatus having hot water boiler means and a detachable coffee-brewing unit.

2. Description of the Prior Art

The typical espresso-type coffeemaking apparatus includes a detachable brewing chamber having a cup or basketlike filter for receiving a quantity of ground coffee and in brewing a certain quantity of coffee liquid. A particular disadvantage in the use of the prior art espresso-type coffeemaking apparatus is the limited quantity of coffee that may be extracted from the portion of ground coffee supported in the basket-type filter. Also, the rather small size and limited filtering area of the cup or basket-type filter element limited the flow rate output of the coffeemaking procedure. Also, the removable cup-shaped filter and particular configuration of the brewing chamber in the prior art espresso coffeemaking devices presented particular problems in properly cleaning and servicing the apparatus. Moreover, the particular design or configuration of the interior surfaces of the coffee-brewing chamber in prior art apparatus was not conducive to turbulent action of the coffee grounds during the coffee-brewing cycle and which resulted in waste, in that the coffee substance was not properly extracted from the coffee particulate.

SUMMARY OF THE INVENTION

The coffee-brewing unit for espresso coffee apparatus of the instant invention obviates many of the above-mentioned difficulties and particularly provides means for increasing the capacity and quality of the coffee liquid as compared with the prior art apparatus. The coffee-brewing chamber of the instant invention is of rather large size as compared with prior art structure and is provided with a substantially large flat disklike filter. The particular configuration of the brewing chamber and the large filter area increases the flow rate output of the apparatus as compared to prior art structure and also provides for more turbulent action of the coffee particulate in the brewing chamber and for fully extracting the coffee substance from the coffee particulate. The design of the coffee-brewing chamber and arrangement admits of easy cleaning and servicing of the apparatus and easy manipulation of the brewing chamber during use.

BRIEF DESCRIPTION OF THE DRAWING

FIG. 1 is an environmental perspective view of the espresso coffee-brewing chamber assembly of the instant invention;

FIG. 2 is a top view of the coffee-brewing chamber assembly in a disposition removed from the espresso coffeemaking apparatus, and with parts removed for purposes of clarity; and FIG. 3 is a sectionalized view of the coffee-brewing chamber assembly.

DESCRIPTION OF THE PREFERRED EMBODIMENT

The coffee-brewing chamber assembly of the instant invention is indicated by numeral 12 and is shown and described in conjunction with a typical espresso-type coffeemaking apparatus 14 having a hot water boiler 16, and conduit mans 18 communicating with the boiler and defining a downwardly opening circular egress opening 20 typically provided with twist-lock-type connector half means 22.

The coffee-brewing chamber assembly 12 includes a generally broad annular chamber body 24 defining substantially a through passageway 26 extending vertically through the interior of the annular body. The circular rim portion 28 of the mouth 30 of the body 24 is provided with circumferential arranged twist lock connector half means 32 adapted for detachable connection with the existing twist lock connector half means 22 of the coffee-brewing apparatus 14.

A cylindrical handle 34, preferably formed of hard plastic or other substance nonconductive of heat, is perpendicularly fixed as at 35 to the brewing chamber body 24. The coffee-brewing assembly 12 is adapted to be manipulated by the handle means 34 and by clockwise counterclockwise movement to twist lock remove or attach the chamber assembly to the espresso coffeemaking apparatus 14.

A filter disk 36, of perforated sheet metal form, is fixedly secured in the lower interior of the chamber body 24 and fully across the passageway 26. A funnel element 38 is fitted in the lower interior of the chamber body 24 and directly subjacently of the filter disk 36. Internal and external thread means respectively 40, 42 preferably provide means for detachably securing the funnel means 38 in the lower interior of the body 24 and provide means for detachably securing the filter disk 36. A rubber O-ring 44 fitted in groove means provided in the circular shoulder portion 46 of the body 24 provides seal means for liquid sealing the funnel element 38 in the coffee-brewing chamber assembly. Radially extending rib portions 48 preferably are provided in the upper structure of the funnel element 38 for conducting the coffee liquid radially inwardly toward an apex opening 50 of the funnel structure and into the spout means 52 of the coffee-brewing chamber assembly.

The spout means 52 of the assembly 12 preferably includes a spout tube 54 and a barrel portion 56 cantilever supporting the tube 54 and permitting swinging adjustable movement of the tube. The right-angular barrel portion 56 is snugly but freely fitted in the apex opening 50 of the funnel structure 38 and is provided with a passage 58 communicating the tube interior 60 with the interior of the chamber body 24. A resilient O-ring seal element 62 is concentrically fitted in groove means in the spout barrel portion 56; the seal element 62 is interposedly arranged between the barrel portion and the apex opening 50 and provides seal means for preventing liquid leakage at the swing mounting of the tubular spout. A short screwplug element 64 is threadedly fitted in the lower portion of the barrel 56 and provides means for cleaning the interior of the tubular spout 54. By manipulating the screwplug 64, a rattail-type brush tool or the like may be reciprocatingly moved in the tube interior for cleaning purposes. When the coffee-brewing chamber 12 is twist locked to the egress opening structure 20 of the coffeemaking apparatus, the spout tube 24 may be swung in an arc to arrange the discharge nozzle opening 66 thereof to a desired position in filling a cup container or the like. The sleevelike projection 68 of the funnel structure 38 preferably is of angular or nutlike form for receiving a wrench or other handtool in threadedly removing or inserting the funnel and spout structure 38, 52 on the coffee-brewing chamber assembly.

While the instant invention is shown and described in a presently preferred embodiment, it will be understood that various changes and modifications may be made may be departing from the spirit and scope of the invention.

I claim:

1. The combination with a South American-type espresso coffeemaking apparatus operative for brewing strong black coffee and having a hot water boiler and conduit means communicating with said boiler defining a downwardly opening wide egress opening, and having twist lock connector half means arranged about said egress opening and adapted for detachably receiving a twist-locked coffee-brewing chamber of prior art design; an improved coffee-brewing chamber assembly including a broad annular chamber body arranged vertically and defining a through vertical passageway, twist lock connector half means supported on said body adapted for detachable engagement with the existing twist lock connector half means of the egress opening, handle means fixed on said chamber body for bidirectional locking and unlocking rotation and manipulation of said chamber body, a coffee filter disk, means removably supporting said disk in the lower interior of said chamber body and fully across said passageway, funnel means supported in said chamber body subjacently of said filter disk and defining an apex opening for drain passage of the coffee liquid, and including spout means communicating with said apex opening for conducting coffee liquid into a cup or the like.

2. A coffee-brewing assembly as set forth in claim 1 wherein said means detachably supporting said funnel means on said body includes mating internal and external threads formed respectively circumferentially on the lower portion of said chamber body and the circular periphery of said funnel means, said funnel means being removably threadedly fitted in the lower portion of said chamber body.

3. A coffee-brewing assembly as set forth in claim 2 wherein said means removably supporting said coffee disk in said chamber body includes means defining a circular internal shoulder surface and wherein said filter disk is supported in said body with the circular periphery thereof being threadedly clampingly secured between said shoulder surface and the circular periphery of said funnel means.

4. A coffee-brewing assembly as set forth in claim 1 wherein said spout means includes a spout tube having a discharge nozzle opening, and including spout-mounting means cantilever supporting said spout tube adjacent the proximal end portion thereof from said funnel means and permitting selective positioning of the discharge nozzle opening.

5. A coffee-brewing assembly as set forth in claim 4 wherein said spout tube mounting means includes a hollow barrel portion projecting angularly from the proximal end of said spout tube and defining passageway means communicating with the tube interior, and with the barrel portion being concentrically freely turnably fitted in the apex opening of said funnel means, and includes O-ring liquid seal means interposed between said apex opening and said barrel portion.

6. A coffee-brewing assembly as set forth in claim 5 wherein the chamber body defines a circular restricted mouth opening, wherein the lower interior of the chamber body is broader than the upper interior thereof and the interior wall surfaces of the chamber body extend upwardly and convergingly toward the mouth opening.

7. A coffee-brewing assembly as set forth in claim 6 wherein the chamber body is of heavy cast metal form.

8. A coffee-brewing assembly as set forth in claim 1 wherein said filter disk is of perforated sheet metal form.